US012798536B2

United States Patent
(12) United States Patent
Strzala

(10) Patent No.: US 12,798,536 B2
(45) Date of Patent: Nov. 17, 2026

(54) PNEUMATIC BRAKE ACTUATOR AND PUSHROD BOOT FOR SUCH ACTUATOR

(71) Applicant: ZF CV Systems Europe BV, Brussels (BE)

(72) Inventor: Wieslaw Strzala, Byczyna (PL)

(73) Assignee: ZF CV Systems Europe BV, Brussels (BE)

( * ) Notice: Subject to any disclaimer, the term of this patent is extended or adjusted under 35 U.S.C. 154(b) by 346 days.

(21) Appl. No.: 18/428,297

(22) Filed: Jan. 31, 2024

(65) Prior Publication Data

US 2024/0262325 A1 Aug. 8, 2024

(30) Foreign Application Priority Data

Feb. 2, 2023 (EP) .................................... 23154730

(51) Int. Cl.

| | |
|---|---|
| ***B60T 17/08*** | (2006.01) |
| ***B60T 11/00*** | (2006.01) |
| ***F16D 65/00*** | (2006.01) |
| ***F16D 65/18*** | (2006.01) |
| *F16D 125/06* | (2012.01) |
| *F16D 125/08* | (2012.01) |
| *F16D 127/02* | (2012.01) |

(52) U.S. Cl.

CPC ............ *B60T 11/00* (2013.01); *F16D 65/005* (2013.01); *F16D 65/18* (2013.01); *F16D 2125/06* (2013.01); *F16D 2125/08* (2013.01); *F16D 2127/02* (2013.01)

(58) Field of Classification Search

CPC ........... B60T 17/08; F16D 65/18; F16D 65/28

See application file for complete search history.

(56) References Cited

U.S. PATENT DOCUMENTS

| | | | | |
|---|---|---|---|---|
| 5,964,140 A * | 10/1999 | Guenther | B60T 13/565 92/128 |
| 2014/0096678 A1 | 4/2014 | Shimomura et al. | |
| 2015/0068851 A1* | 3/2015 | Switzer | B60T 17/081 188/1.11 E |
| 2024/0391445 A1* | 11/2024 | Derouault | B60T 17/08 |
| 2024/0401716 A1* | 12/2024 | Py | F16K 31/56 |

FOREIGN PATENT DOCUMENTS

| | | |
|---|---|---|
| EP | 0692651 A1 | 1/1996 |
| EP | 1791742 A1 | 6/2007 |

* cited by examiner

*Primary Examiner* — Tan Q Nguyen

(74) *Attorney, Agent, or Firm* — Dickinson Wright PLLC

(57) ABSTRACT

A rod boot (24) seals a rod opening (20), through which a piston rod of a piston of a pneumatic actuator is guided from a retained position to an extended position. The rod boot is connected to the rod opening (20) and the piston rod (18). A mantle (30) of the rod boot (24) has a first section (34) and a second section (36) opposite from the first section (34). The first section (34) is connected to the rod opening (20) and the second section (36) is connected to a mounting section (38) of the piston rod (18). The second section (36) is inverted inwardly (40) relative to the first section (34), and the longitudinal dimensions of the first section (34) and second section (36) vary relative to each other as a function of a relative position of the first section (34) to the second section (36).

18 Claims, 4 Drawing Sheets

PNEUMATIC BRAKE ACTUATOR AND PUSHROD BOOT FOR SUCH ACTUATOR

FIELD

The present disclosure relates to a pneumatic brake actuator for a vehicle, in particular a commercial vehicle, including an actuator housing having a pressure chamber and a piston chamber, a piston that is mounted inside the piston chamber and configured to reciprocatingly move between a retained position and extended position as a function of pressure inside the pressure chamber, a piston rod connected to the piston, wherein the piston rod is guided through the actuator housing via a rod opening, a compression spring being effective to push the piston towards the retained position and a rod boot for sealing the rod opening, wherein the rod boot is connected to the rod opening and the piston rod, the rod boot including a mantle, the mantle having a first section and a second section opposite from the first section and wherein the first section is connected to the rod opening and the second section is connected to a mounting section of the piston rod.

BACKGROUND

Pneumatic brake actuators of the aforementioned kind are commonly used in the commercial vehicle industry. It is the aim of such pneumatic brake actuator to generate a braking force which is, in turn, transmitted to the vehicle wheel.

State of the art pneumatic brake actuator include a housing which includes a pressure chamber and a piston chamber having a piston mounted therein. The piston is configured to reciprocatingly move between a retained position and an extended position as a function of pressure inside the pressure chamber. The piston is connected to a piston rod which is guided through an out of the actuator housing via a rod opening.

To ensure that the interior of the brake caliper remains free from contamination, for example dirt or water, a rod boot is utilized for sealing the rod opening. The rod boot is connected to the rod opening and the piston rod.

Although such actuators are commonly used and well-proven, there is still room for improvement. One major drawback associated with these kinds of actuators is that the actuator housing needs to provide an accommodation volume for accommodating the rod boot, in particular when the piston is in its extended position and the rod boot is compressed. Furthermore, the compressed rod boot generates a counterforce acting towards the retained position which needs to be overcome by an additional degree of pressure inside the pressure chamber. When the pressure inside the pressure chamber is limited, the maximum stroke of the piston rod might not be available due to the above.

SUMMARY

As a consequence, it is an object of the present disclosure to provide a pneumatic brake actuator of the initially mentioned type which overcomes the aforementioned problems as much as possible. In particular, it was an object of the present disclosure to provide a pneumatic brake actuator which includes a smaller total length and requires less actuation pressure to operate the piston rod into its maximum stroke position.

The present disclosure attains the aforementioned object by providing a pneumatic brake actuator according to the present disclosure. According to the present disclosure, it is provided that the second section of the rod boot is inverted inwardly relative to the first section, wherein a longitudinal dimension of the first section and a longitudinal dimension of the second section vary with respect to each other as a function of a relative position of the first section to the second section.

The present disclosure is based upon the finding that by utilizing a rod boot having one section inverted inwardly relative to the other section, the rod boot is moved with the respective section of the piston rod out of the actuator housing when the piston rod is moved into its extended position. Thus, the rod boot requires a considerable less installation volume within the actuator housing. Furthermore, due to the rod boot design, no counterforce is generated when the piston rod is in the extended position, because the rod boot would not be compressed inside the actuator housing. For a given pressure inside the pressure chamber, this results in a better output regarding the maximum extended position, also called "maximum stroke". Furthermore, the new design allows for a reduction of the overall length of the actuator.

According to a preferred embodiment, the rod boot extends out of the actuator housing through the rod opening, when the piston is moved towards its extended position.

According to a preferred embodiment, a diameter of the mantle tapers from the first section to the second section. This ensures that the length of the first section and the second section can vary as a function of the relative position of the first section of the second section without substantial friction between the sections.

Preferably, the mantle includes a varying thickness. The thickness of the mantle can be used as another way to ensure that the first section and the second section can be moved conveniently with regard to one another. Moreover, the thickness of the mantle may be locally increased for those sections of the mantle that are heavily stressed during operation. Furthermore, the stiffness of certain sections of the mantle may be adjusted as required.

According to yet another preferred embodiment, the mantle includes at least one rib. The rib is used to adjust the stiffness of the mantle. This is in particular beneficial for those embodiments in which the mantle tapers from the first section to the second section. With the help of the ribs, it can be ensured that the stiffness of the mantle remains constant although the mantle surface is reduced from the first section to the second section.

Preferably, said rib extends along the longitudinal axis. According to another preferred embodiment, the mantle includes four ribs, said ribs being equidistantly spaced around said mantle. Preferably, the at least one rib is arranged at the inside of said mantle.

According to another preferred embodiment, the mantle includes at least one groove. The groove is utilized for adjusting the stiffness of the mantle. Like the ribs, the groove can also be utilized to compensate for a changing surface area of the mantle from the first section to the second section. Preferably, the groove is arranged at the outside of the mantle. According to yet another preferred embodiment, the groove is arranged adjacent to the at least one rib. Forming a rib at the inside of the mantle may lead to the formation of a groove at the outside.

According to yet another preferred embodiment, the first section includes a flange section for securing said first section to the rod opening. The flange section is used to ensure a proper sealing of the piston chamber against the surroundings of the housing. According to a preferred embodiment, the flange section includes a circumferential groove, which is configured to form a seal with the rod opening. With the help of said groove, the rod boot can be easily installed at the housing while it is at the same time ensured that the boot forms a durable connection with the housing.

According to yet another preferred embodiment, the second section includes a shoulder for engaging with a corresponding shoulder of the piston rod to form a seal therewith. This design ensures a durable connection between the rod boot and the piston root to seal the piston chamber of the actuator.

Preferably, the second section is secured to said piston rod by way of a clamping ring. With the help of said clamping ring, the durability of the connection between rod boot and piston rod is improved.

The present disclosure as herein above has been described according to a first aspect relating to the brake actuator of the present disclosure. According to a second aspect, the present disclosure however also relates to a rod boot for sealing a rod opening for a pneumatic brake actuator of a commercial vehicle, wherein said rod boot is configured to be connected to a rod opening and a piston rod, said rod boot including a mantle, said mantle having a first section and a second section opposite from the first section, and wherein the first section is configured to be connected to a rod opening of a pneumatic brake actuator and the second section is configured to be connected to a mounting section of a piston rod of the actuator.

The present disclosure provides that the second section is inverted inwardly relative to the first section, wherein a longitudinal dimension of the first section and a longitudinal dimension of the second section vary with respect to each other as a function of a relative position of the first section to the second section.

The rod boot of the present disclosure accordingly shares the technical advantages and preferred embodiments of the brake actuator of the present disclosure. In this regard, reference is made to the description above and the preferred embodiments described therein.

According to a third aspect, the present disclosure relates to the use of a rod boot according to the previous embodiments for sealing a rod opening of a pneumatic brake actuator of a commercial vehicle. The use of a rod boot of the present disclosure accordingly shares the technical advantages and preferred embodiments of the inventive brake actuator and the rod boot of the present disclosure. In this regard, reference is made to the description above and preferred embodiments described therein.

For a more complete understanding of the present disclosure, the present disclosure will now be described in detail with reference of the accompanying drawings. The detailed description will illustrate and describe what is considered as a preferred embodiment of the present disclosure. It should of course be understood that various modifications and changes in form or detail could readily be made without departing from the spirit of the present disclosure. It is therefore intended that the present disclosure may not be limited to the exact form and detail shown and described herein, nor to anything or less than the whole of the present disclosure disclosed herein and is claimed thereafter. Further, the features described in the description, the drawings and the claims disclosing the present disclosure may be essential for the present disclosure considered alone or in combination. In particular, any reference signs in the claims shall not be construed as limiting the scope of the present disclosure. The wording "including" does not exclude other elements or steps. The word "a" or "an" does not exclude a plurality.

BRIEF DESCRIPTION OF THE DRAWINGS

The present disclosure will now be described with reference to the accompanying drawings which illustrate, by way of example and not by way of limitations, one of several possible embodiments of the spring brake actuator provided herein, and wherein.

DETAILED DESCRIPTION

Figure 1:
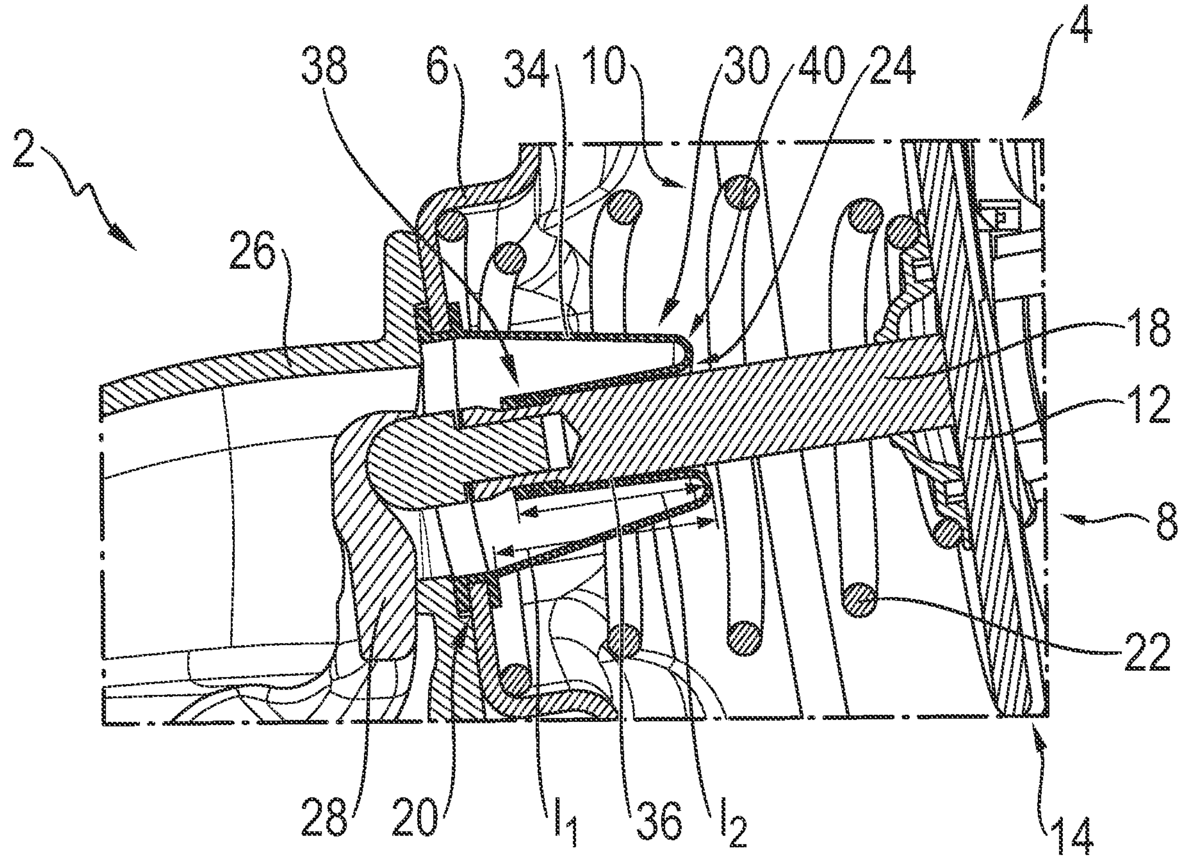
FIG. 1 shows a preferred embodiment of pneumatic brake actuator according to the concept of the present disclosure in a sectional view, wherein the piston is in a retained position.

FIG. 1 shows a vehicle braking system 2. The vehicle braking system 2 includes a pneumatic actuator 4. The pneumatic actuator 4 includes an actuator housing 6. The actuator housing 6 includes a pressure chamber 8 and a piston chamber 10. In the piston chamber 10, a piston 12 is mounted. The piston 12 is configured to reciprocatingly move between a retrained position 14 and in extended position 16 (shown in FIG. 2) as a function of pressure inside the pressure chamber 8.

A piston rod 18 is connected to piston 12. The piston rod 18 is guided through and out of the actuator housing 6 via a rod opening 20. The pneumatic brake actuator 4 moreover includes a compression spring 22. The compression spring 22 is effective to push the piston 12 towards the retained position 14. The pneumatic brake actuator 4 moreover includes a rod boot 24. The rod boot 24 is configured for sealing the rod opening 20. The rod boot 24 is connected to the rod opening 20 and the piston rod 18.

The rod boot 24 includes a mantle 30. The mantle 30 has a first section 34 and a second section 36. The second section 36 is opposite from the first section 34. The first section 34 is connected to the rod opening 20. The second section 36 is connected to a mounting section 38 of the piston rod 18. The second section 36 of the rod boot 24 is inverted inwardly 14 relative to the first section 34. A longitudinal dimension $I_1$ of the first section 34 and a longitudinal dimension $I_2$ of the second section 36 vary with respect to each other as a function of a relative position of the first section 34 to the second section 36. The braking system 2 moreover includes a caliper box 26. In the caliper box 26 a lever 28 is arranged.

Figure 2:
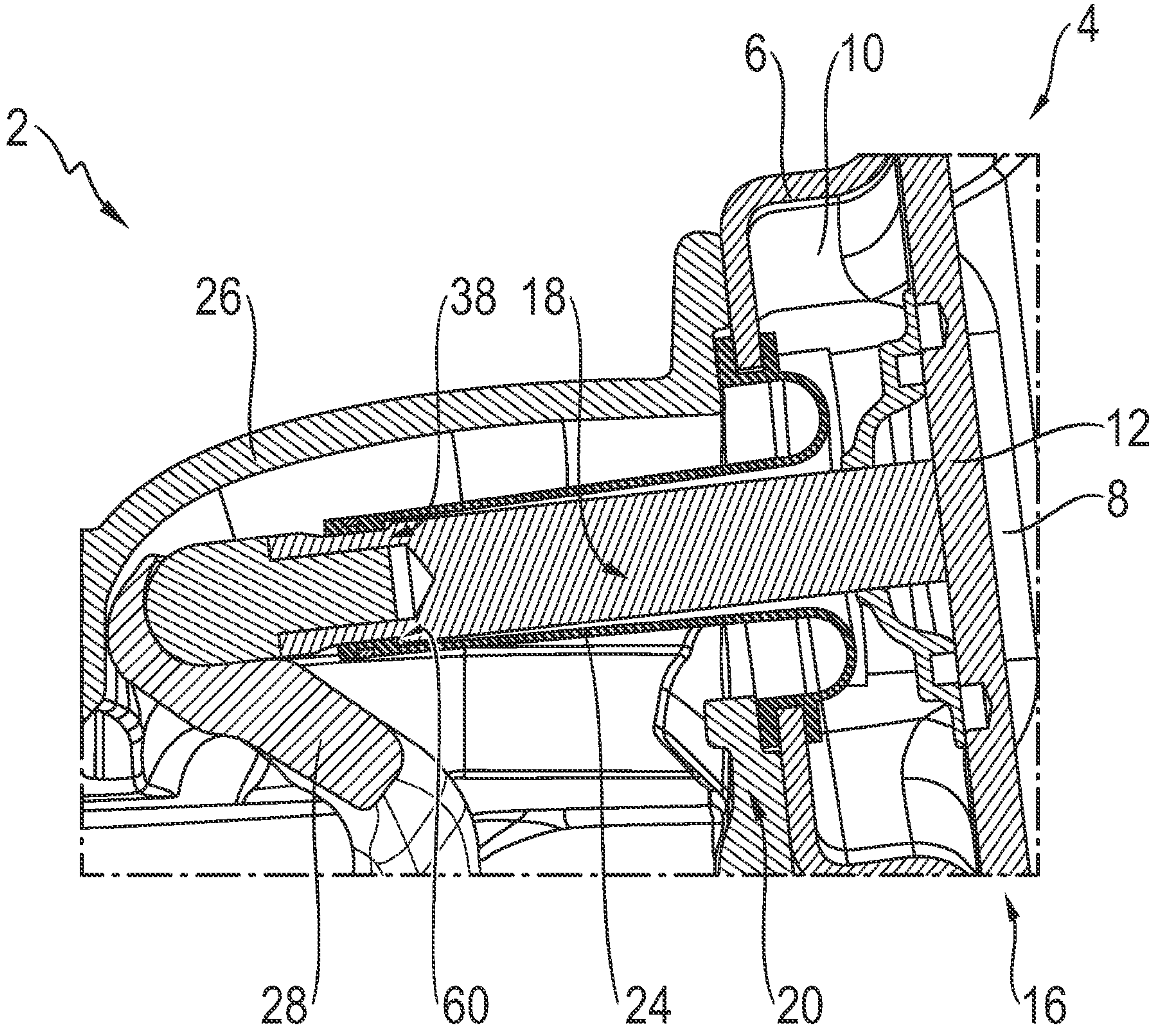
FIG. 2 shows the preferred embodiment of the pneumatic brake actuator according to FIG. 1, wherein the piston is in an extended position.

FIG. 2 shows the actuator of FIG. 1 in an extended position 16. It can be seen that the rod boot 24 now extends out of the actuator housing 6 through the rod opening 20 and into the caliper box 26. The volume that is now occupied by the rod boot 24 inside the actuator housing 6 is minimal.

Figure 3:
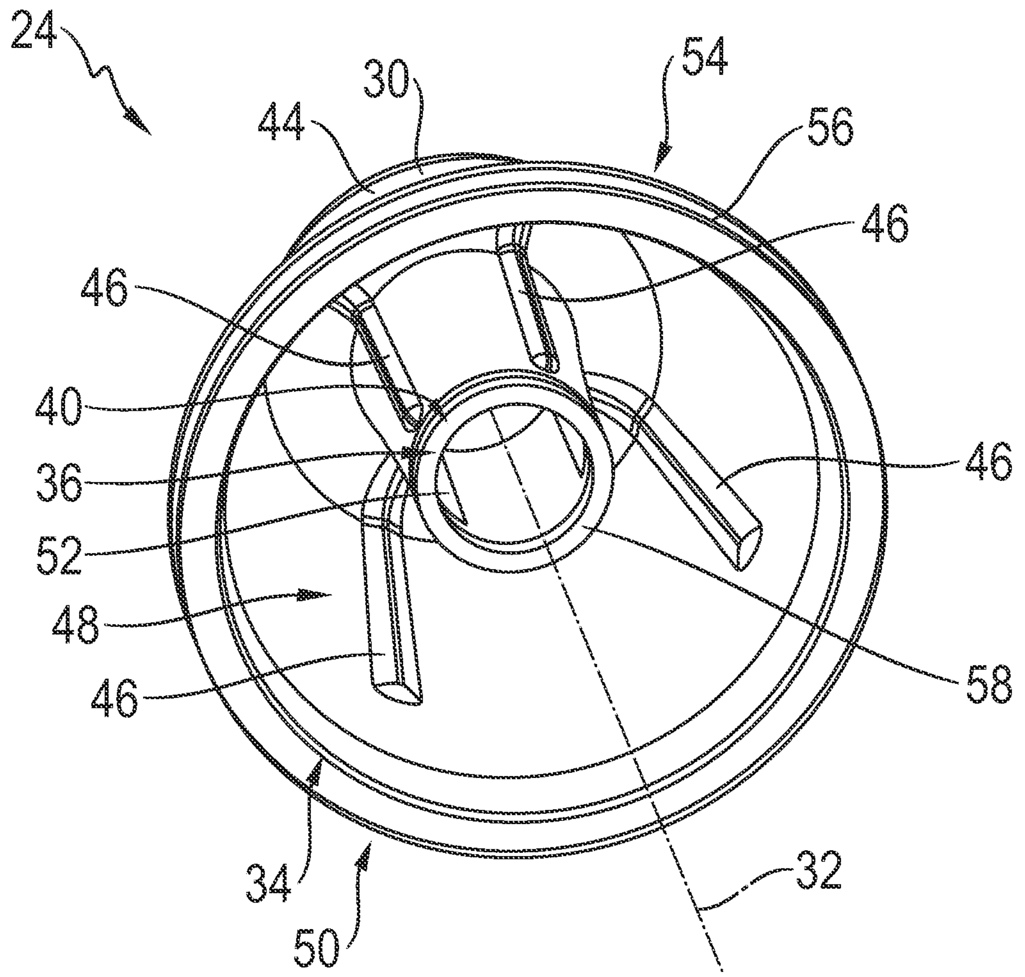
FIG. 3 shows a perspective view of a rod boot according to the concept of the present disclosure.
Figure 4:
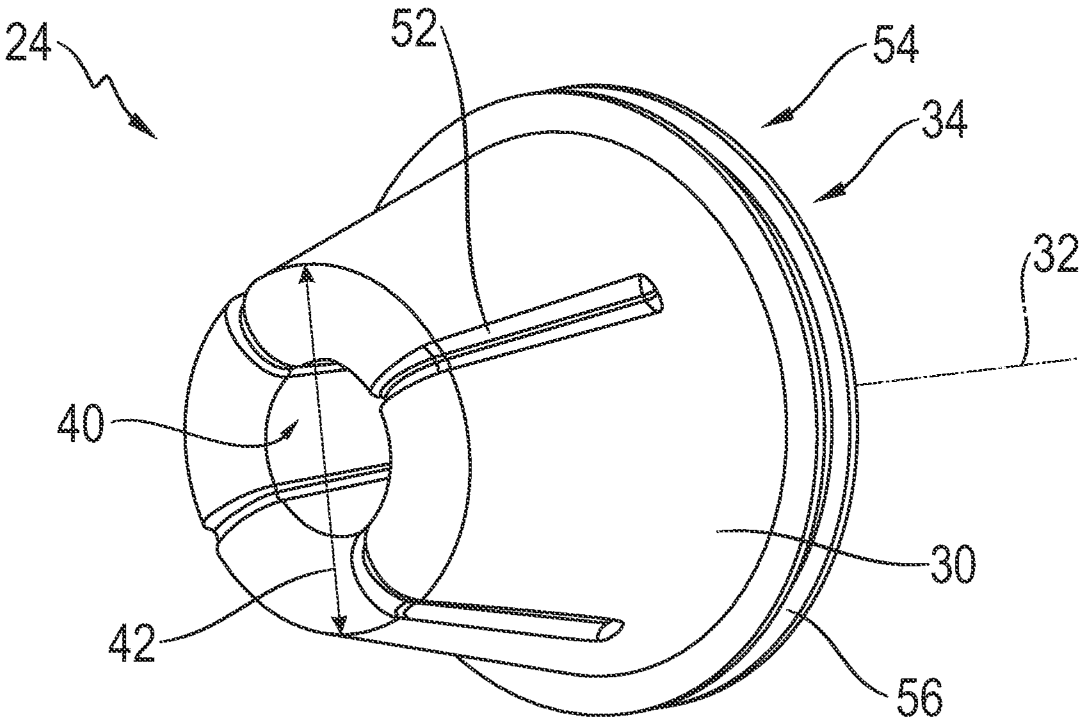
FIG. 4 shows a perspective view of a rod boot according to the concept of the present disclosure.

FIGS. 3 and 4 show perspective views of the rod boot 24 in perspective views. The rod boot includes the mantle 30. The diameter 42 of the mantle 30 tapers from the first section 34 to the second section 36. Furthermore, the mantle 30 includes a varying thickness. The mantle includes four ribs 46. The ribs 46 extend along a longitudinal axis 32. The ribs 46 are equidistantly spaced around the mantle 30. The ribs 46 are arranged at the inside 48 of the mantle 30. Furthermore, the mantle includes grooves 52. The grooves 52 are arranged at the outside 50 of the mantle 30. The grooves 52 are arranged adjacent to the ribs 46. The mantle 30 includes four grooves 52. A rib 46 at the inside 48 of the mantle 30 forms a groove 52 at the outside 50 of the mantle 30. The mantle 30 has a thickness 44.

Furthermore, the first section 34 includes a flange section 54. The flange section 54 is configured for securing said first section 34 to the rod opening 20. The flange section 54 includes a circumferential groove 56. The circumferential groove 56 is configured to form a seal with the rod opening 20. The second section 36 includes a shoulder 58. The shoulder 58 is configured for engaging with a corresponding shoulder 60 (see FIGS. 1 and 2) of the piston rod 18, to form a seal therewith.

LIST OF REFERENCE SIGNS (PART OF THE DESCRIPTION)

2 braking system
4 pneumatic brake actuator
6 actuator housing
8 pressure chamber
10 piston chamber
12 piston
14 retained position
16 extended position
18 piston rod
20 rod opening
22 compression spring
24 rod boot
26 caliper box
28 lever
30 mantle
32 longitudinal axis
34 first section
36 second section
38 mounting section
40 inward inversion
42 mantle diameter
44 mantle thickness
46 rib
48 mantle inside
50 mantle outside
52 mantle groove
54 flange section
56 circumferential groove
58 mantle shoulder
60 rod shoulder

What is claimed is:

1. A pneumatic brake actuator (4) for a vehicle, comprising:

an actuator housing (6) having a pressure chamber (8) and a piston chamber (10), a piston (12) mounted inside the piston chamber (10) and that reciprocatingly moves between a retained position (14) and an extended position (16) as a function of pressure inside the pressure chamber (8), a piston rod (18) connected to the piston (12), wherein the piston rod (18) is guided through the actuator housing (6) via a rod opening (20), a compression spring (22) that pushes the piston (12) towards the retained position (14), and a rod boot (24) that seals the rod opening (20), wherein the rod boot (24) is connected to the rod opening (20) and the piston rod (18), the rod boot (24) including a mantle (30), the mantle (30) having a first section (34) and a second section (36) opposite from the first section (34), and wherein the first section (34) is connected to the rod opening (20) and the second section (36) is connected to a mounting section (38) of the piston rod (18), wherein the second section (36) is inverted inwardly (40) relative to the first section (34), wherein a longitudinal dimension ($l_1$) of the first section (34) and a longitudinal dimension ($l_2$) of the second section (36) vary with respect to each other as a function of a relative position of the first section (34) to the second section (36);

wherein the longitudinal dimension ($l_1$) of the first section (34) is longer than the longitudinal dimension ($l_2$) of the second section (36) when the piston (12) is in the retained position.

2. The brake actuator (4) according to claim 1, wherein the rod boot (24) extends out of the actuator housing (6) through the rod opening (20) when the piston (12) is in its extended position (14).

3. The brake actuator according to claim 2, wherein the rod boot (24) extends into a caliper box (26) from the rod opening (20) when the piston (12) is in its extended position (14).

4. The brake actuator according to claim 3, wherein the piston rod actuates a lever disposed within the caliper box when the piston (12) is in its extended position.

5. The brake actuator (4) according to claim 1, wherein a diameter (42) of the mantle (30) tapers from the first section (34) to the second section (36).

6. The brake actuator (4) according to claim 1, wherein the mantle (30) includes a varying thickness.

7. The brake actuator (4) according to claim 1, wherein said first section (34) includes a flange section (54) that secures said first section (34) to the rod opening (20).

8. The brake actuator (4) according to claim 7, wherein said flange section (54) includes a circumferential groove (56) that forms a seal with the rod opening (20).

9. The brake actuator (4) according to claim 7, wherein said second section (36) includes a shoulder (58) that engages with a corresponding shoulder (60) of the piston rod (18) to form a seal therewith.

10. The brake actuator according to claim 1, wherein the longitudinal dimension ($l_1$) of the first section (34) is shorter than the longitudinal dimension ($l_2$) of the second section (36) when the piston (12) is in the extended position.

11. The brake actuator according to claim 1, wherein the second section (36) axially overlaps the first section (34) when the piston (12) is in the retained position, wherein the second section (36) is moveable substantially without friction relative to the first section (34) when the piston (12) moves toward the extended position.

12. A pneumatic brake actuator (4) for a vehicle, comprising:

an actuator housing (6) having a pressure chamber (8) and a piston chamber (10), a piston (12) mounted inside the piston chamber (10) and that reciprocatingly moves between a retained position (14) and an extended position (16) as a function of pressure inside the pressure chamber (8), a piston rod (18) connected to the piston (12), wherein the piston rod (18) is guided through the actuator housing (6) via a rod opening (20), a compression spring (22) that pushes the piston (12) towards the retained position (14), and a rod boot (24) that seals the rod opening (20), wherein the rod boot (24) is connected to the rod opening (20) and the piston rod (18), the rod boot (24) including a mantle (30), the mantle (30) having a first section (34) and a second section (36) opposite from the first section (34), and wherein the first section (34) is connected to the rod opening (20) and the second section (36) is connected to a mounting section (38) of the piston rod (18), wherein the second section (36) is inverted inwardly (40) relative to the first section (34), wherein a longitudinal dimension ($I_1$) of the first section (34) and a longitudinal dimension ($I_2$) of the second section (36) vary with respect to each other as a function of a relative position of the first section (34) to the second section (36), wherein the mantle (30) includes at least one rib (46).

13. The brake actuator (4) according to claim 12, wherein said rib (46) extends along the longitudinal axis (32).

14. The brake actuator (4) according to claim 12, wherein the mantle (30) includes four ribs (46), said ribs (46) being equidistantly spaced around said mantle (30).

15. The brake actuator (4) according to claim 12, wherein said at least one rib (46) is arranged at the inside (48) of said mantle (30).

16. The brake actuator (4) according to claim 12, wherein the mantle (30) includes at least one groove (52).

17. The brake actuator (4) according to claim 16, wherein said grove (52) is arranged at the outside (50) of said mantle (30) radially adjacent to the at least one rib (46), which is arranged on the inside of said mantle (30).

18. A rod boot (24) for sealing a rod opening (20) for a pneumatic brake actuator of a vehicle, wherein said rod boot (24) is configured to be connected to a rod opening (20) and a piston rod (18), said rod boot comprising:

a mantle (30), said mantle (30) having a first section (34) and a second section (36) opposite from the first section (34), and wherein the first section (34) is configured to be connected to a rod opening (20) of a pneumatic brake actuator (4) and the second section (36) is configured to be connected to a mounting section (38) of a piston rod (18) of the actuator (4), wherein the second section (36) is inverted inwardly (40) relative to the first section (34), wherein a longitudinal dimension ($I_1$) of the first section (34) and a longitudinal dimension ($I_2$) of the second section (36) vary with respect to each other as a function of a relative position of the first section (34) to the second section (36);

wherein the rod boot (24) is installed in the rod opening (20) of the pneumatic brake actuator, wherein said first section (34) includes a flange section (54) that secures said first section (34) to the rod opening (20).

* * * * *